United States Patent [19]

Muscara

[11] Patent Number: 5,623,976
[45] Date of Patent: Apr. 29, 1997

[54] METHOD AND APPARATUS FOR SUPPLYING CONTAINERS

[75] Inventor: Dominic Muscara, Iselin, N.J.

[73] Assignee: Benjamin Moore & Co., Montvale, N.J.

[21] Appl. No.: 592,491

[22] Filed: Jan. 26, 1996

Related U.S. Application Data

[60] Continuation-in-part of Ser. No. 512,626, Aug. 8, 1995, Pat. No. 5,570,731, which is a division of Ser. No. 185,030, Jan. 24, 1994, Pat. No. 5,464,047.

[51] Int. Cl.$^6$ .................................................. B65B 3/28
[52] U.S. Cl. ......................... 141/83; 141/1; 141/102; 141/196
[58] Field of Search ............................ 141/1, 83, 102, 141/128, 153, 196; 177/60, 89, 116, 119, 122, 25.18, 25.19, 50

[56] References Cited

U.S. PATENT DOCUMENTS

| | | | |
|---|---|---|---|
| 3,805,903 | 4/1974 | Muskat et al. | 177/50 |
| 3,862,666 | 1/1975 | Muskat et al. | 177/50 |
| 4,582,097 | 4/1986 | Izzi et al. | 141/1 |
| 4,676,282 | 6/1987 | Bellini et al. | 141/1 |
| 4,844,297 | 7/1989 | Smith | 141/83 X |
| 5,159,959 | 11/1992 | Bohm | 141/1 |
| 5,285,825 | 2/1994 | Townsley | 141/83 X |

*Primary Examiner*—J. Casimer Jacyna
*Attorney, Agent, or Firm*—William E. Mouzavires

[57] ABSTRACT

Method and apparatus for automatically supplying containers with a liquid using an electronic scale and high speed microprocessor for measuring the weight of liquid introduced into the containers. The first container is partially filled to a predetermined percentage of a target weight as measured by the scale. Flow into the container is then stopped by closing a valve controlled through the scale and microprocessor. The actual weight of the liquid introduced at this point is measured and a correction factor is determined by subtracting the predetermined percentage weight from the actual weight. Flow into the container is then resumed until a second predetermined weight is achieved as measured by the scale and equal to the target weight minus the correction factor. Flow at this point is stopped by again closing the valve. The actual weight of liquid in the container is again measured and compared with the second predetermined weight to arrive at a correction factor which is used in determining the liquid weight to be introduced into the next container. However the next and subsequent containers are supplied without stoppage until the newly calculated predetermined weight is reached as measured by the scale. For each subsequent container the predetermined weight is calculated using a correction factor calculated at the end of the fill of the previous container.

9 Claims, 4 Drawing Sheets

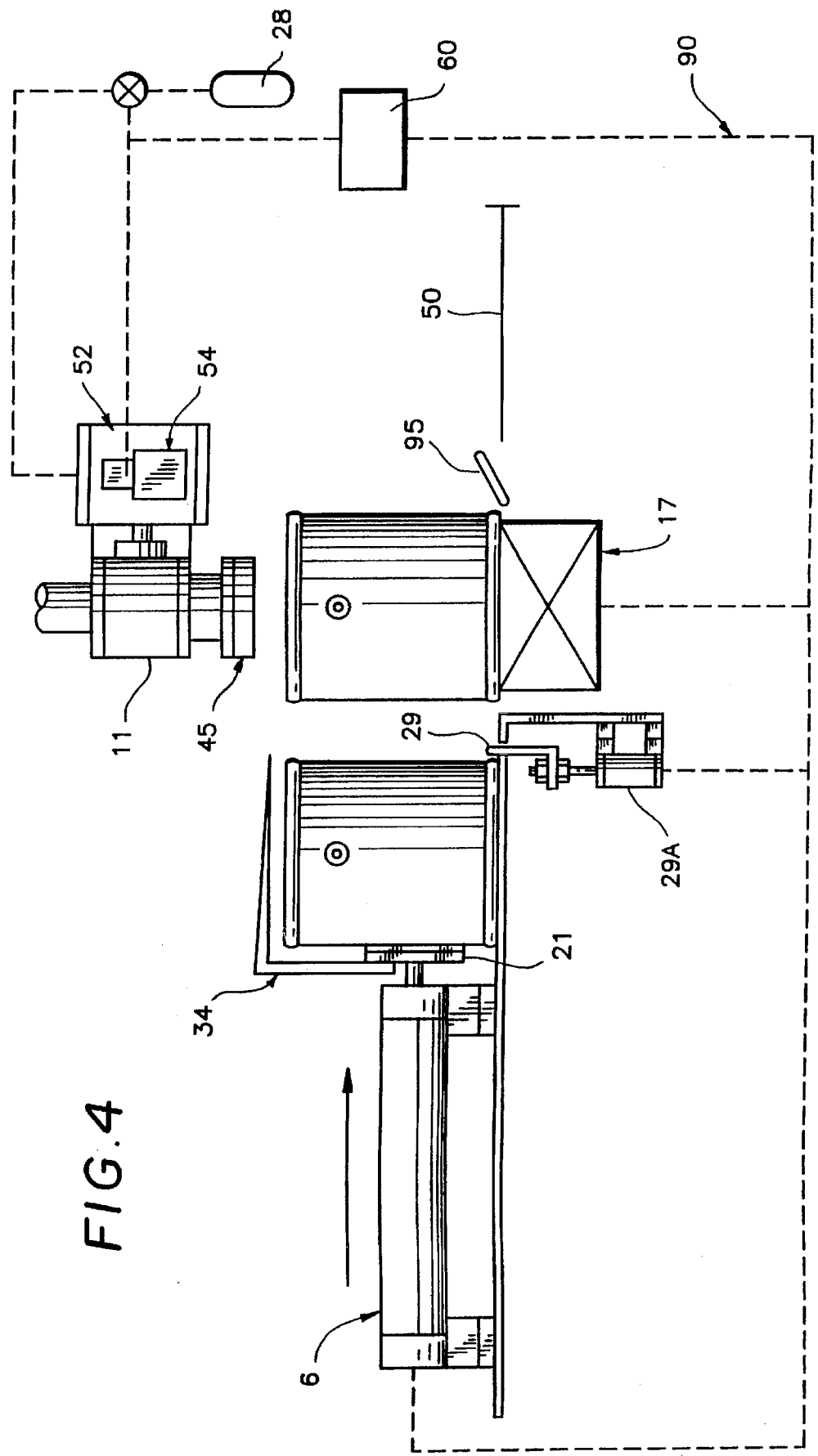

METHOD AND APPARATUS FOR SUPPLYING CONTAINERS

RELATED APPLICATIONS

The present invention is a continuation-in-part of my U.S. application, Ser. No. 08/512,626 filed Aug. 8, 1995 entitled METHOD AND APPARATUS FOR DISPENSING PAINT INTO CONTAINERS, now U.S. Pat. No. 5,570,731, which is a division of my prior application, Ser. No. 08/185,030 filed Jan. 24, 1994, now U.S. Pat. No. 5,464,047, issued Nov. 7, 1995. The entire disclosure of each of my aforesaid applications is hereby incorporated by reference into the present application as part hereof.

BACKGROUND OF INVENTION

Numerous methods and apparatus for introducing liquid into containers exist in the prior art. Such methods and apparatus utilize various controls and measurements for determining when a desired amount of a substance has been introduced into the container. Included in such systems are photoelectric, volumetric, ultrasonic and weight measurements and controls.

OBJECTS OF THE PRESENT INVENTION

The present invention relates to methods and apparatus for introducing predetermined amounts of substances into containers, and although not limited thereto, is particularly useful for filling paint containers such as cans with paints or similar coatings.

An object of the present invention is to provide a novel and improved method and apparatus for introducing a predetermined amount of a substance into containers. Included herein are such method and apparatus that will supply liquid such as paint into containers in a manner that is faster and more accurate than those of the prior art.

A further object of the present invention is to provide a novel and improved method and apparatus for supplying containers with a predetermined amount of liquid in a highly accurate manner and yet are suitable for commercial high speed production.

SUMMARY OF THE INVENTION

In one preferred form of the invention when applied to supplying a plurality of containers with a substance, a first container is partially filled to a predetermined percentage of a target weight as measured by a scale. The target weight is the final desired weight to be introduced into the container. Flow into the container is then stopped by closing a valve controlled through the scale and a microprocessor. The actual weight of the substance introduced at this point is measured and a correction factor is determined by subtracting the predetermined percentage of the target weight from the actual weight. Flow into the container is then resumed until a second predetermined weight is achieved as measured by the scale and equal to the target weight minus the correction factor. Flow at this point is stopped by again closing the valve. The actual weight of substance in the container is again measured and compared with the second predetermined weight to arrive at a correction factor which is used to calculate a predetermined weight of substance to be introduced into the next container. However the next and subsequent containers are supplied continously without stoppage until the newly calculated predetermined weight is reached as measured by the scale. The predetermined weight to be introduced into each subsequent container is calculated using a correction factor determined at the end of the filling of the next previous container. The predetermined weight should equal the target weight within a certain tolerance of, for example, one half of an ounce. At the conclusion of each filling cycle if the target weight is not reached within the tolerance, the computer will send a signal to jog the valve open and closed in steps until the target weight is reached within the aforementioned tolerance. The above method is automated with the use of electronic scales in circuit with a microprocessor and fill valves controlled preferably by pneumatic actuators in turn controlled by solenoids.

DRAWINGS

Other objects and advantages of the present invention will become apparent from the following more detailed description of a preferred form of the invention taken in conjunction with the attached drawings in which:

FIG. 4 is a schematic view of portions of the apparatus as included in a system which is shown in dotted lines.

DETAILED DESCRIPTION

Figure 1:
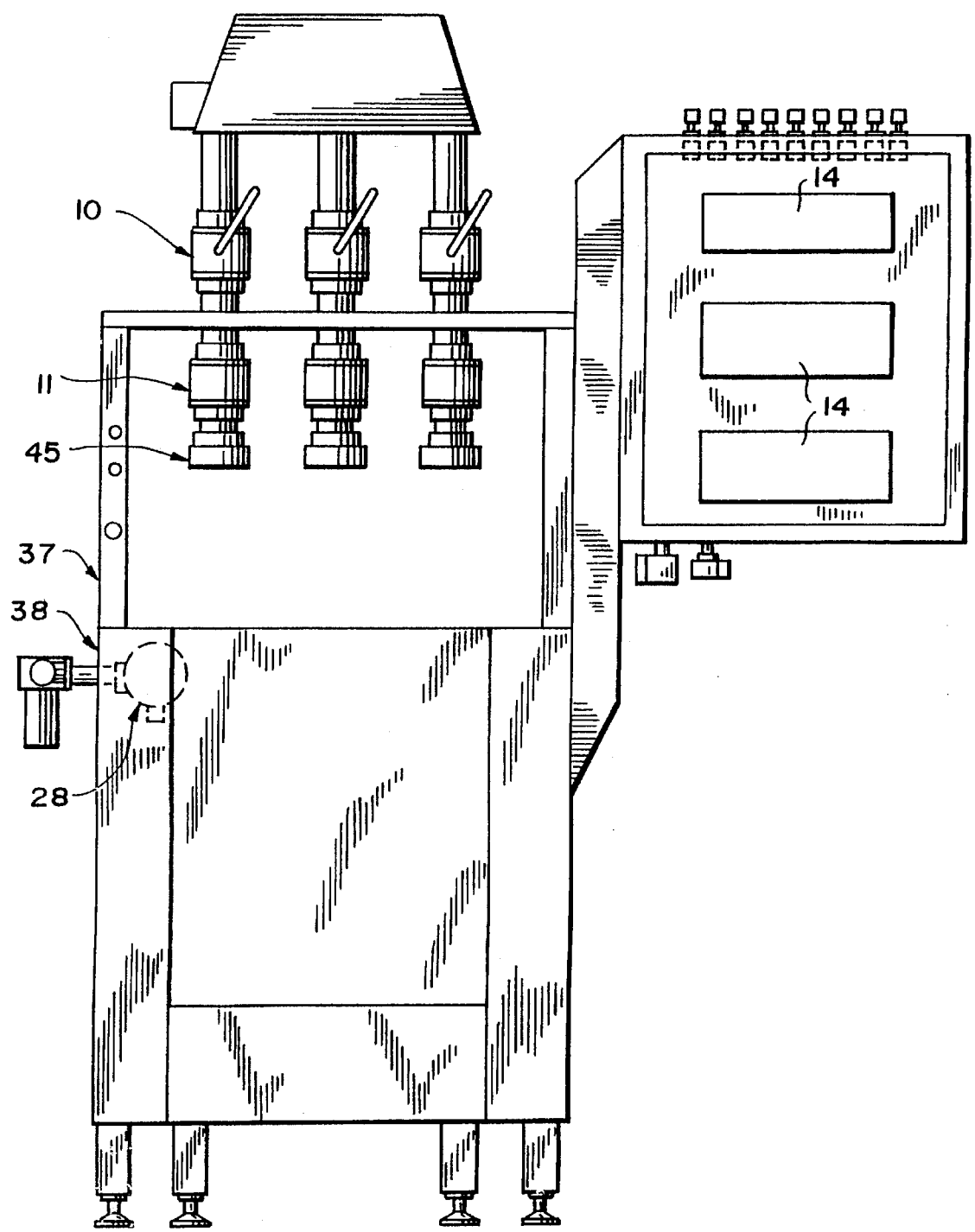
FIG. 1 is a front elevational view of preferred apparatus for carrying out the method of the present invention.

Referring now to the drawings, one preferred method in accordance with the present invention utilizes a plurality of filling valves 11 and associated nozzles 45, there being three shown in the drawings. Containers such as paint cans to be filled with a liquid such as paint are conveyed on to weight scales, preferably electronic weight scales 17, from a supply area 44 adjacent the scale. In the preferred embodiment shown, three individual scales are provided respectively below the filling nozzles 45 so that the weight of each of the containers is individually measured as will be described below. When the containers are initially conveyed to the filling station under the filling nozzles 45, the weight of the containers is measured and stored so that later when the weight of the paint introduced into the containers is being measured, the weight of the cans will not be included.

In accordance with the method of the prsent invention, a predetermined desired "target" weight of paint is to be sequentially introduced into each of the containers from the same supply batch 100. The filling operation commences with a first container which is initially supplied with paint from the associated valve 11 and nozzle 45 until a percentage, preferably fifty percent (50%), of the target weight is introduced into the container. This is measured by the associated scale 17 which, through an associated circuit 90 (FIG. 4), sends a signal to operate a valve actuator 52 associated with valve 11 to close the valve. The actual weight of the paint introduced into the container at this point is measured by the scale 17 under the first container. The actual weight in the container measured by the scale includes paint that was in the air between the valve 11 and the container when the scale measured the predetermined weight and sent a signal to close the valve 11. The predetermined weight, i.e. 50% of the target weight is subtracted from the actual weight in the container measured to arrive at a correction factor. Subsequently flow of paint into the first container is resumed by opening the associated valve 11. As the container is filled the associated scale continuously measures the weight of the paint in the container, and when the measured weight reaches the target weight minus the correction factor which was determined after the stoppage at 50% described above, the valve 11 is closed. The scale then measures the actual weight and a correction factor is calculated for use in the next container fill cycle as will be described. Should the actual weight measured at the end of the cycle be less than the target weight minus a tolerance of about one half of an ounce, additional paint is jogged into the container in steps until the target weight is reached within a given tolerance as mentioned above.

The valve 11 above the next or second container is opened and the second container is then filled continuously without any intermediate stoppage until a predetermined amount of paint has been introduced in the second container as measured by the scale 17 associated with the second container. This predetermined amount equals the target weight minus the correction factor determined at the end of the first cycle, i.e. after the first container was filled with the predetermined weight. The associated valve 11 is closed and the actual weight introduced into the second container is then measured by the associated scale. The predetermined weight at this point (the target weight minus the correction factor determined at the end of the filling of the first container) is subtracted from the actual weight to determine a correction factor to be used in the next container filling operation. The third and all subsequent containers are filled in the same manner as the second container with the exception that the actual correction factors for each container are those obtained at the end of the fill of the next previous container. With the exception of the first container all containers are filled continuously to the predetermined weight without stoppage until the original batch 100 (FIG. 2) of paint is exhausted. When a new batch is used, the first container to be filled with paint from the new batch, is filled using the same procedure described above in connection with the first container. All of the measured weights are processed by a computer which also calculates each of the correction factors and the predetermined weights at which the valves 11 will be closed for each of the container filling cycles. The opening of the valves 11 is of course also computerized so that the entire filling operation is automatic.

Preferred apparatus for carrying out the aforementioned method of the present invention is shown in the drawings, and with reference to FIG. 1, it includes the fill valves 11 and nozzles 45 overlying a fill station in which three scales are provided corresponding to the three fill valves and nozzles respectively. Valve 11 and fill nozzles 45 are mounted in an upper frame 37 which in turn is supported on a lower frame 38. Manually operated valves 10 are also provided in the preferred embodiment as shown in FIG. 1. Supported by the upper and lower frames is a control box generally designated 18 including electrical and pneumatic circuitry, a microprocessor 60 and weight controls 14. FIG. 1 also shows an air tank 28 which is used to supply pneumatic actuators 52 (see FIG. 4) which are used to actuate the fill valves 11 between open and closed positions. In the preferred embodiment, valve actuators 52 are in turn controlled by solenoids 54 as shown in FIG. 4. Also as shown in FIG. 4, the scales 17 are connected in circuit 90 with the solenoids 54 to control them in response to weight sensed by the scales.

In the preferred embodiment, the paint containers are conveyed from the supply area 44 to the scales by means of a pusher 21 comprised of a vertical plate actuated by a pneumatic motor or cylinder 6. When pusher 21 is extended from the position shown in FIG. 1 (not shown), it will push three container simultaneously on to the three scales. Element 43 shown in FIG. 3 serves as a guide for the incoming cans. At this point an automatic zero tracking system will "tare" the weight of the containers so that in subsequent measurements of the weight of paint introduced into the container, the weight of the container itself will not be included. In the preferred apparatus, each of the scales is a 6" by 6" diamond-base type manufactured by WEIGH-TRONIX of Landing, N.J. which also supplies the microprocessor ("batch controller") and the program under the designation WI-130. This apparatus is capable of operating at sixty readings per second and is also referred to as "Weight Data Acquisition Controller" or "Fully Programmable Weight Indicator".

Figure 2:
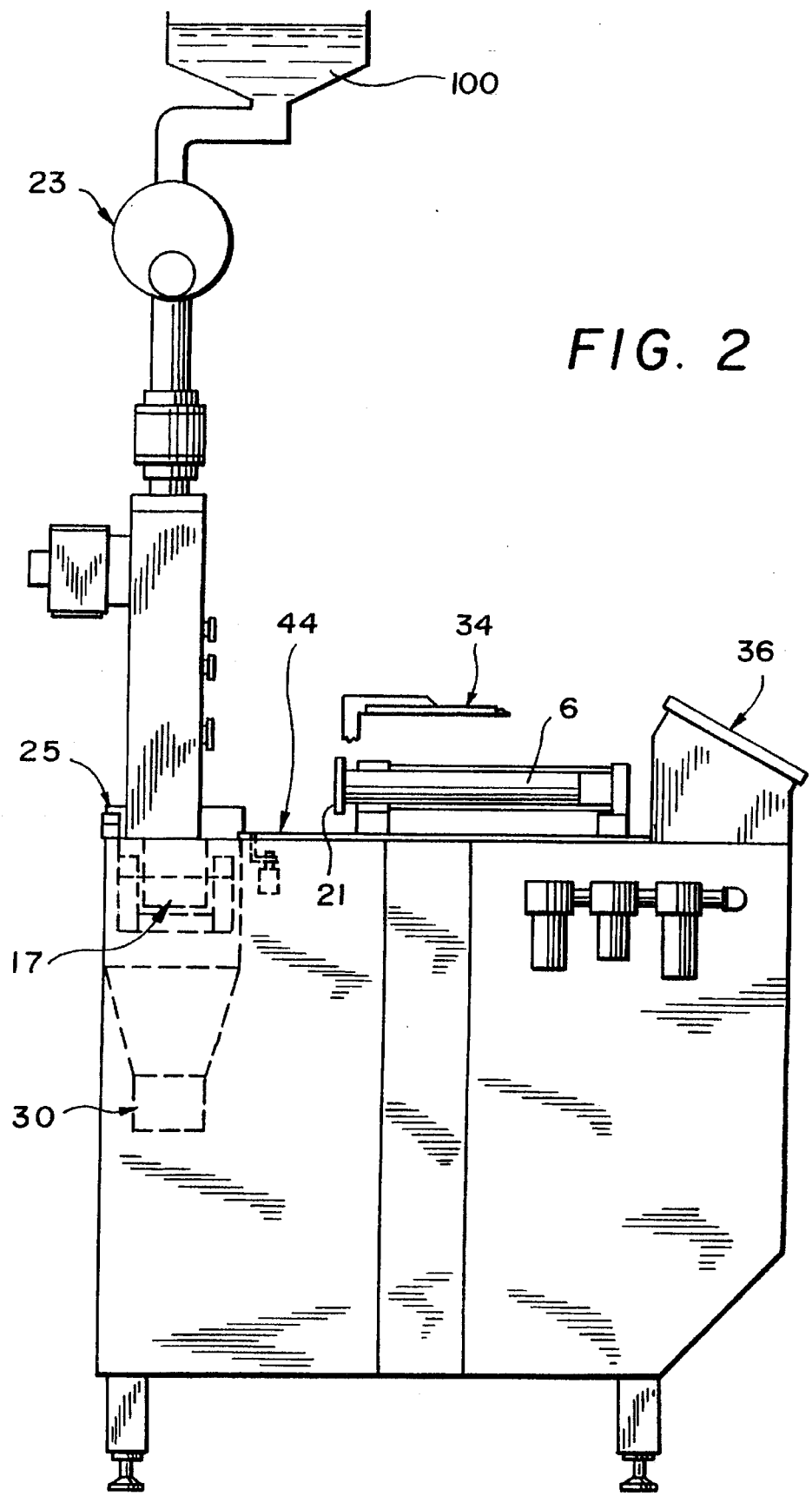
FIG. 2 is a side elevational view of the apparatus shown in FIG. 1.

After the containers are pushed in position on the scales limit switch 1 will be actuated and the pusher 21 is retracted causing a limit switch such as 5 (FIG. 3) to be actuated by a cam 2 (see FIG. 3) to open the fill valve 45 associated with the first container to commence filling the container with paint from a paint manifold 23 (FIG. 2) which in turn is supplied by a batch of paint 100 (see FIG. 2). The filling proceeds until preferably 50% of the predetermined target weight is reached whereupon the scale 17 associated with the first container senses the weight and sends a signal to the solenoid 54 associated with the valve actuator 52 to close the valve 11. The computer or microprocessor 60 measures the actual weight introduced into the first container at this point in the process and then calculates a correction factor by subtracting fifty percent (50%) of the target weight from the actual weight. With this correction factor the computer 60 then calculates a predetermined weight at which the valve 11 must be closed in order to reach the target weight upon resumption of flow of paint in the container. The computer then sends a signal to resume flow by opening the valve 11 and paint is introduced until the predetermined weight (target weight minus correction factor) is measured by the scale at which time the computer sends a signal to close the valve 11. The computer measures the actual weight introduced into the container and calculates a correction factor to be used in the next filling operation on the next container by subtracting the predetermined weight from the actual weight. The computer then sends a signal to initiate filling of the next or second container opening valve 11 associated therewith.

The second container is filled continuously until the target weight minus the previous correction factor determined by the computer at the end of the last cycle, is measured by the scale. The computer then sends a signal closing the valve 11 associated with the second container. After the second container has received the paint that was in the air when the predetermined weight was measured and the valve closing signal was sent, the actual weight in the second container is measured and a correction factor is calculated by the computer for the next container filling operation. The process for the second container is repeated for all subsequent containers until the original batch 100 of paint is exhausted. In each container filling operation the correction factor determined at the end of the fill of the previous container is used. The computer is also programmed so that should the weight of the paint introduced into a container at the end of a fill cycle be less than the target weight minus a tolerance of about one half of one percent, the computer will send signals to jog paint in steps into the container until the weight reaches the target weight or within a tolerance of the target weight, the tolerance being about one half of one ounce.

When the original batch 100 of paint is exhausted, the first container to be filled from the new batch of paint is filled using the process described above with respect to the first container. Each of the subsequent containers are then filled to the predetermined weight without interruption using the safety factors of the previous filled container as described above.

After each three containers have been filled, can pusher 21 is actuated to extend it to a second extended position beyond the scales where it pushes the three containers over a teeter bar 95 to a discharge area generally defined by a horizontal surface 50 on the side of the scales 17 opposite the pusher 21 as best shown in FIG. 4. Once the containers move sufficiently over the teeter bar 95, they will pivot over the teeter bar to disengage from the scales thus speeding the resetting of the scale to zero and in turn speeding the overall production. The filled containers are then removed from the discharge area 50 in any suitable manner.

Figure 3:
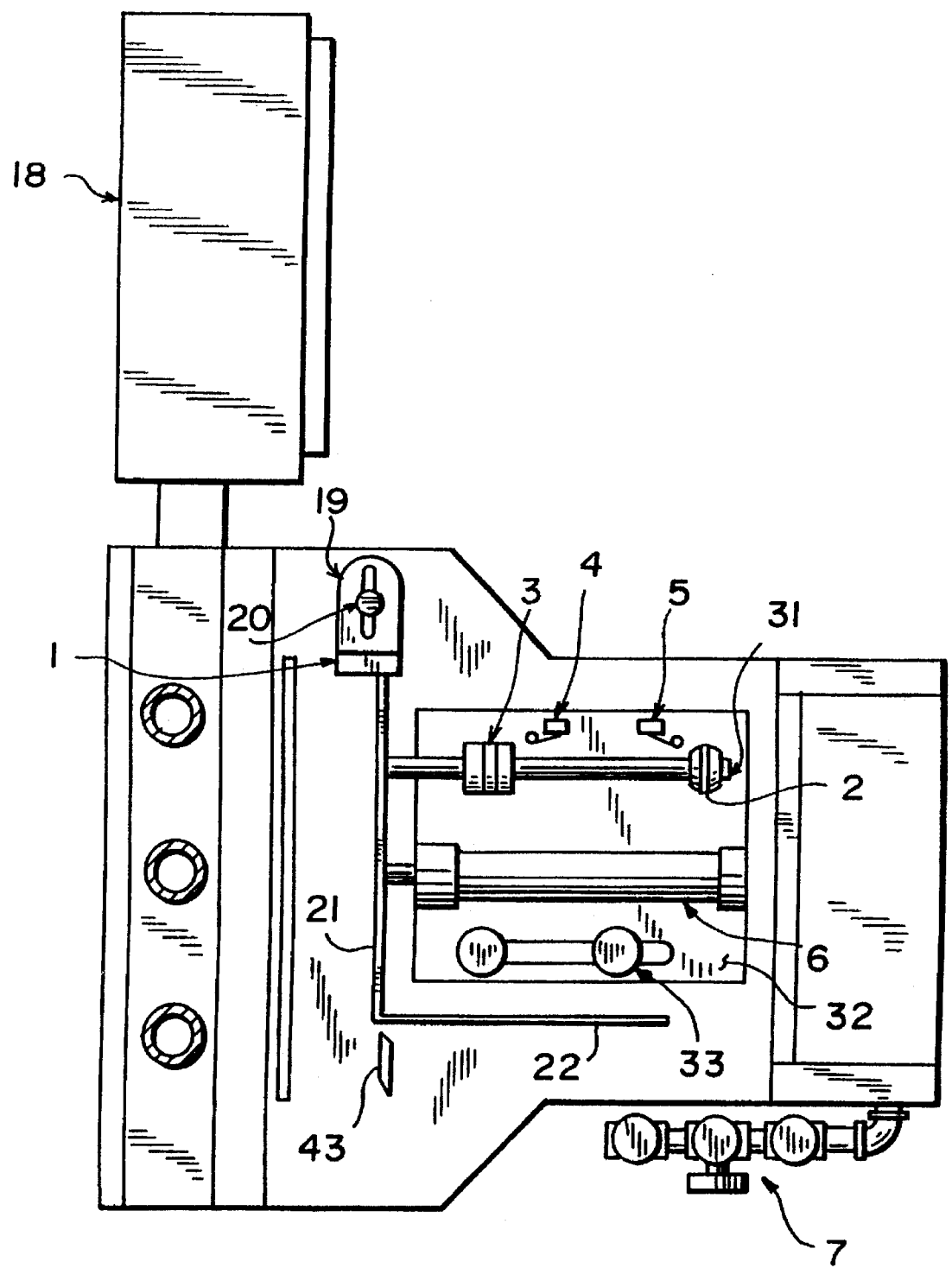
FIG. 3 is a plan view of the apparatus.

In the preferred apparatus, a vertically moving gate 29 is provided between the container supply area and the scales as best shown in FIGS. 3 and 4. Gate 29 is moved by ah actuator 29a in the control circuit 90 shown in FIG. 4 between a retracted position where it is below the level of the surface of the scales and the supply surface 44 and a raised position where it extends above the supply surface to prevent incoming empty cans from engaging the cans on the scales. Gate 29 in its raised position may also be used as a guide for guiding the incoming cans into position on the supply surface 44 just prior to being pushed on to the scales. When the third container is filled, the associated scale will send a signal through the circuit that will cause the gate 29 to be lowered and the can pusher 21 extended to push the three cans from the scales to the discharge area 50 while passing over the teeter bar 95 as described above.

Referring to FIGS. 2 and 4, the preferred apparatus of the present invention also includes a drip shield 34 in the form of a generally horizontal plate 34 fixed to and above the pusher 21 to be movable therewith while overlying containers such as shown in FIG. 4 to prevent drips of paint from the fill nozzles 45 contacting the tops of the containers. It is also preferred that a drip collector pan 30 be incorporated in the lower frame 38 below the scales as shown in FIG. 2. In addition it is preferred that a plurality of horizontally extending guides in the form of vertical plates be provided on opposite sides of the scales 17 to further guide and properly position the containers on the scales. Portions of one of the guides is shown at 25 in FIG. 2.

As best shown in FIG. 3, the preferred apparatus also utilizes a pusher assembly including a horizontal base in the form of a plate 32 on which is mounted the pneumatic actuator 6 and the pusher 21. A guide rod 31 fixed to the pusher is slidably mounted in a suitable bearing 3 fixed to plate 32. When the pusher 21 pushes the cans into filling position on the scales, cam 2 on pusher rod 31 will activate switch 4 to retract the pusher rod 31, and when switch 5 is actuated by cam 2, the fill valve will open to commence filling. The position of plate 32 on table top 44 is adjustable and once the desired position is achieved, plate 32 is secured relative to table 44 by hold-down screws 33. FIG. 3 also shows air filters 7 utilized in conjunction with the pneumatic system. FIG. 3 also shows bracket 19 holding limit switch 1 and a screw 20 securing the bracket 19 in position. In addition the preferred apparatus includes a vertical plate 22 fixed to the pusher 21 at right angles as shown in FIG. 3 to prevent advancement of incoming empty cans until pusher 21 is fully retracted.

A control panel is shown at 36 in FIG. 2 however it should be understood that once the predetermined desired target weight to be introduced into the containers is punched into the system by the operator of the machine, the entire operation is automatic during which time weight values may be seen at the readout located at 14 in the control box (see FIG. 1). The target weight to be supplied into the containers is fed into the computer at the outset as is the percentage of the target weight for the first container to be filled starting with each new batch of paint. Although 50% of the target weight in the above-described embodiment is used, other percentages may be employed. In addition four or more paint cans or containers may be handled by the apparatus between each loading of containers by the pusher 21.

It will be seen from the above that the present invention provides an extremely accurate method and apparatus for filling containers with liquids preferably paint cans with paint in a fully automated manner highly suitable for commercial production.

Although preferred embodiments of the present invention have been shown in the drawings and described above, it should be understood that the scope of the present inventions is not limited to the specific forms disclosed but rather is defined in the claims appended below in this application as well as continuation applications that may be filed.

What is claimed is:

1. A method of supplying a substance into a container comprising in combination: introducing into the container a substance, weighing with a scale the amount of substance introduced into the container, stopping the flow of substance into the container when the scale indicates a first predetermined weight equal to a percentage of a target weight, measuring the weight of the substance in the container after the flow has been stopped to arrive at a first actual weight, comparing said first actual weight with said predetermined weight to determine the difference and a correction factor equal to said difference, resuming the flow of substance into the container and stopping the flow when the scale reaches a second predetermined weight equal to the target weight minus the correction factor, measuring the weight of the substance in the container after the flow has been stopped the second time to arrive at a second actual weight and comparing said second actual weight with the second predetermined weight to determine a second correction factor to be used in a next supply cycle.

2. A method of supplying a plurality of containers with a substance including the steps of supplying a first container with a substance in accordance with each of the steps defined in claim 1, continuously supplying a second container until the scale reaches a third predetermined weight equal to the target weight minus the second correction factor.

3. The method defined in claim 2 including the steps of measuring the weight of the substance in the second container after the flow has been stopped to arrive at a third actual weight and comparing the third actual weight with said third predetermined weight to arrive at a third correction factor to be used in a next supply cycle.

4. The method of supplying containers as defined in claim 3 further including the steps of supplying a third and subsequent containers from the same batch of substance and calculating a correction factor only at the end of each supply cycle to be used in the next supply cycle.

5. The method defined in claim 1 wherein the tolerance is plus or minus about 0.5 ounces of substance.

6. The method defined in claim 1 used to fill containers with paint.

7. The method defined in claim 1 wherein said percentage of a target weight is about fifty percent (50%).

8. The method defined in claim 1 using a computer in circuit with the scale to obtain weight readings at a speed of at least sixty readings per second and to send a signal to close a flow valve to stop flow of the substance into the container when the predetermined weight is reached as measured by the scale.

9. A method of sequentially supplying a plurality of containers while the containers are at the same filling station with a paint substance comprising the steps of:

conveying a plurality of containers to a filling station at the same time, introducing substance into a first container at the filling station, weighing the substance introduced with a scale at the filing station, stopping flow of the substance into the container when the scale reaches a predetermined weight, weighing the substance at the filing station after the flow has been stopped to arrive at an actual weight, comparing the actual weight with the predetermined weight to arrive at a correction factor, using the correction factor to calculate a second predetermined weight to be used in the next container to be supplied, after the first container has been filed with paint continuously supplying the next container at the filling station until the second predetermined weight is reached as measured by a scale, stopping the flow of substance into the next container, weighing the substance in the second container after flow has been stopped to arrive at a second actual weight, comparing the second actual weight and second predetermined weight to arrive at a second correction factor and repeating the above steps for each of the subsequent containers to be supplied.

* * * * *